US007578943B2

(12) United States Patent
Kurashima et al.

(10) Patent No.: US 7,578,943 B2
(45) Date of Patent: Aug. 25, 2009

(54) LIQUID DISCHARGE HEAD AND PRODUCING METHOD THEREFOR

(75) Inventors: Rei Kurashima, Yokohama (JP); Takashi Ushijima, Yokohama (JP); Koichiro Nakanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 11/436,633

(22) Filed: May 19, 2006

(65) Prior Publication Data

US 2006/0261034 A1 Nov. 23, 2006

(30) Foreign Application Priority Data

May 23, 2005 (JP) ............................ 2005-148894

(51) Int. Cl.
*G11B 5/127* (2006.01)

(52) U.S. Cl. ............................ 216/27; 216/80; 216/99; 347/47

(58) Field of Classification Search .................. 216/27, 216/80, 99; 347/65, 66, 47
See application file for complete search history.

(56) References Cited

U.S. PATENT DOCUMENTS

| | | | | |
|---|---|---|---|---|
| 7,213,908 | B2 * | 5/2007 | Chwalek et al. | 347/65 |
| 2005/0128255 | A1 | 6/2005 | Nakanishi | 347/68 |
| 2005/0140737 | A1 | 6/2005 | Ushijima et al. | 347/64 |
| 2005/0210645 | A1 * | 9/2005 | Xin-Shan et al. | 29/25.35 |
| 2006/0261035 | A1 | 11/2006 | Nakanishi | 216/27 |

FOREIGN PATENT DOCUMENTS

| | | |
|---|---|---|
| JP | 5-229128 | 9/1993 |
| JP | 10-209113 | 8/1998 |

* cited by examiner

*Primary Examiner*—Lan Vinh
(74) *Attorney, Agent, or Firm*—Fitzpatrick, Cella, Harper & Scinto

(57) ABSTRACT

A loss in the rigidity of a substrate for a liquid discharge head having nozzles at a high density can be suppressed. A liquid discharge head includes plural pressure generating chambers respectively provided with pressure generating elements, plural nozzle apertures respectively communicating with the plural pressure generating chambers and adapted to discharge a liquid, and a reservoir with which the plural pressure generating chambers commonly communicate respectively through communicating parts. The pressure generating chambers and the reservoir respectively have recessed portions formed respectively on one and the other of two principal planes of the same substrate, and the reservoir contains a portion shallower than a portion within the reservoir that communicates with the pressure generating chambers.

3 Claims, 8 Drawing Sheets

LIQUID DISCHARGE HEAD AND PRODUCING METHOD THEREFOR

BACKGROUND OF THE INVENTION

1. Field of the Invention

The present invention relates to a liquid discharge head adapted for use in a liquid discharge recording apparatus, which discharges a liquid droplet by a discharge energy generated by a pressure generating element thereby forming an image on a recording medium, and a producing method therefor.

2. Related Background Art

In a recording apparatus of a liquid discharge method by discharging and depositing a liquid droplet on a recording medium thereby forming an image, microfine working and complex patterning are required for forming a structure with a larger number of nozzles, in order to meet the requirements for recording of high image quality and a high definition. Therefore producing methods for the liquid discharge head have been proposed, utilizing a micromachining technology, which can prepare fine and complex patterns in a simple manner on a monocrystalline silicon substrate for example by an anisotropic etching.

As an example, a producing method for an ink jet head, disclosed in Japanese Patent Application Laid-open No. H05-229128 is shown in FIG. 8. A flow path substrate 500 is constituted of a single crystal silicon substrate, and is subjected, on one surface thereof, to anisotropic etchings in two steps, thereby integrally forming an ink flow path including a nozzle 501, a pressure generation chamber 502, an ink supply opening 503, and a reservoir 504.

Also a producing method for an ink jet head, disclosed in Japanese Patent Application Laid-open No. H10-209113, is shown in FIGS. 9A to 9D. In forming a groove by an anisotropic etching on a single crystal Si (110) substrate 600, a groove forming mask pattern 601 is employed to reduce an area dependence of the etching rate. This step is shown in FIG. 9A, in which an etching is executed utilizing a mask pattern 601 having an aperture 602, thereby forming a narrow groove 603 as shown in FIG. 9B. Subsequently, a silicon portion 604 between these narrow grooves 603 is etched off as shown in FIG. 9C to form a wide groove 605 as shown in FIG. 9D.

The producing method disclosed in Japanese Patent Application Laid-open No. H05-229128, utilizing dependence of etching rate on the crystalline orientation, can form a reservoir with a high precision, but restrictions may result in the process since the usable crystalline orientation of single crystal silicon substrate is limited.

Also in case of forming a reservoir in a single crystal silicon substrate, when nozzles are formed with a high density by an anisotropic etching on an Si (100) substrate, the thickness of the substrate becomes inevitably smaller. It is therefore difficult to maintain a rigidity of the substrate, thus being unable to achieve an improved production yield and a durability and a stability of the head. Also in case of employing an Si (110) substrate, the process will become more difficult such as restriction on the freedom of shape, and requirement for multi-layered masks for regulating the depth of the reservoir.

The producing method disclosed in Japanese Patent Application Laid-open No. H10-209113 utilizes an anisotropic etching of a single crystal Si (110) substrate. Also in this case, restrictions may result in the process since the usable crystalline orientation of single crystal silicon substrate is limited.

In particular, a desired shape precision may not be met in case a groove to be formed has a complex non-rectangular shape, an etching depth varies within an etching aperture area, or a relatively large etching depth is required.

SUMMARY OF THE INVENTION

The present invention has been made in consideration of the drawbacks in the prior technologies, and an object thereof is to provide a liquid discharge head capable of suppressing a loss in the rigidity of a substrate, and a producing method therefor.

The liquid discharge head of the present invention includes plural pressure generating chambers respectively provided with pressure generating elements, plural nozzle apertures respectively communicating with the plural pressure generating chambers and adapted to discharge a liquid, and a reservoir with which the plural pressure generating chambers commonly communicate respectively through communicating parts, wherein the pressure generating chambers and the reservoir respectively have recessed portions formed respectively on one and the other of two principal planes of a same substrate, and the reservoir contains a portion shallower than a communicating part nearby area within the reservoir in the vicinity of the communicating part.

According to the present invention, since the reservoir contains a portion shallower than a communicating part nearby area within the reservoir in the vicinity of the communicating part as described above, the rigidity of the substrate is not unexpectedly lowered in an area of the reservoir.

DETAILED DESCRIPTION OF THE PREFERRED EMBODIMENTS

Producing methods for a liquid discharge head in embodiments of the present invention will be explained with reference to the accompanying drawings.

In order to form a reservoir of a liquid discharge head by a plasma etching, a groove having substantially vertical lateral walls is formed on a surface of an Si substrate, by a dry etching utilizing for example an ICP (inductively coupled plasma) discharge (hereinafter called "ICP discharge etching"). In the plasma etching, the single crystal silicon substrate is not restricted in the crystalline orientation, but an Si (100) substrate is ordinarily employed.

Figure 1A:
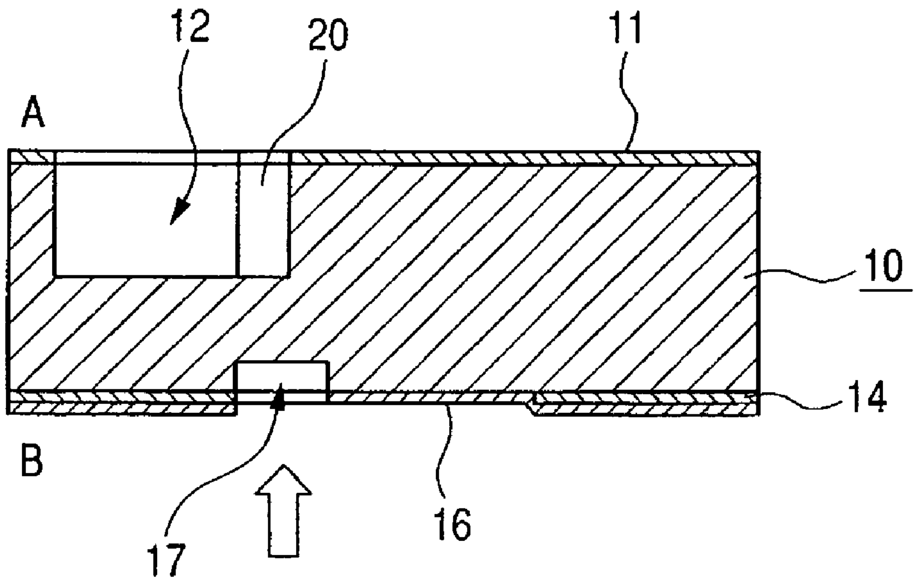
FIGS. 1A and 1B are views showing process steps of a producing method for a liquid discharge head in an embodiment of the present invention.
Figure 1B:
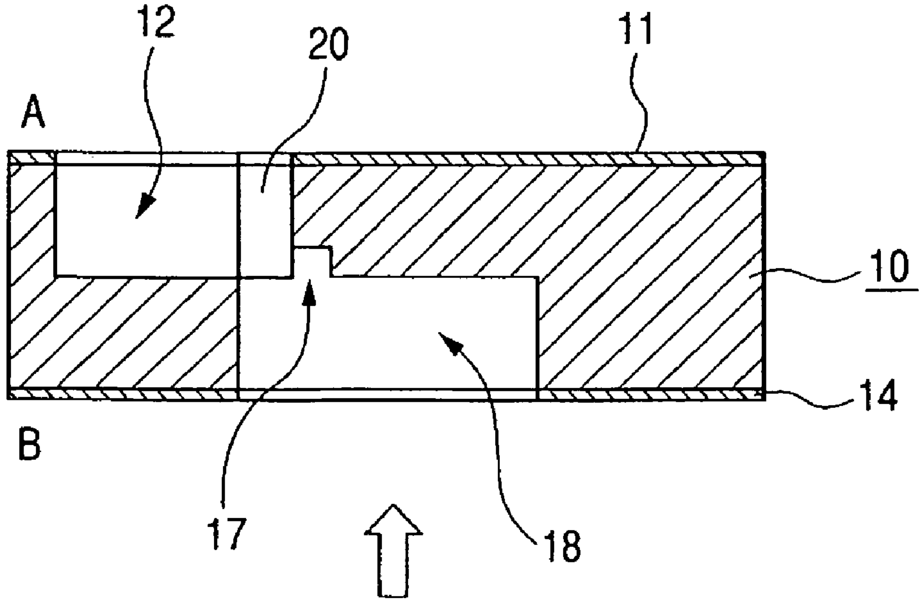

FIGS. 1A and 1B are views showing process steps of a producing method for a liquid discharge head in an embodiment.

(1) As shown in FIG. 1A, on one plane (surface A) of two principal planes of a substrate 10, an etching mask pattern 11, having an aperture corresponding to a pressure generating chamber 12 and a rear constricted part 20 constituting a communicating part, is formed. Also on the other plane (surface B) of the substrate 10, a first etching mask pattern 14, having an aperture corresponding to a reservoir 18, is formed as a first layer. Then, as a second layer thereon, a second etching mask pattern 16 having an aperture for etching only a communicating part nearby area 17, including a communicating part where the rear constricted part 20 is opened in the reservoir and a nearby area.

(2) After the step (1), the substrate 10 is subjected, on the surface A thereof, to an ICP discharge etching utilizing the etching mask pattern 11, thereby forming a recessed portion corresponding to the pressure generating chamber 12 and the rear constricted part 20.

(3) After the step (2), the substrate 10 is subjected, on the surface B thereof, to an ICP discharge etching utilizing the second etching mask pattern 16, thereby forming a recessed portion corresponding to a communicating part nearby area 17, including the communicating part and the vicinity thereof, within a recessed portion corresponding to the reservoir 18.

(4) After the step (3), the second etching mask pattern 16 on the surface B is removed by etching, and an ICP discharge etching is executed utilizing the first etching mask pattern 14 thereby forming a recessed portion corresponding to the reservoir 18.

As the communicating part nearby area 17, formed with the second etching mask pattern 16, is deeper (closer to the surface A) than the recessed portion formed by the first etching mask pattern 14, a secure communication can be realized with the constricted portion 20 formed on the surface A of the substrate. Therefore, the recessed portion, formed with the first etching mask pattern 14, need not be overetched excessively and the substrate can be protected from a loss in the rigidity.

In the present embodiment, any etching mask patterns may be employed as long as they show a selectivity to Si in the ICP discharge etching and the first layer and the second layer are selectively removable. For example, the first layer may be formed by patterning a thermal oxide film, and the second layer may be formed by patterning a resist material. In such case, both etching mask patterns have a high etching selectivity ratio to Si. As to the removal of the etching mask patterns, the resist material can be selectively removed by an oxygen plasma, and the thermal oxide film can be selectively removed by BHF (buffered hydrogen fluoride).

Figure 2A:
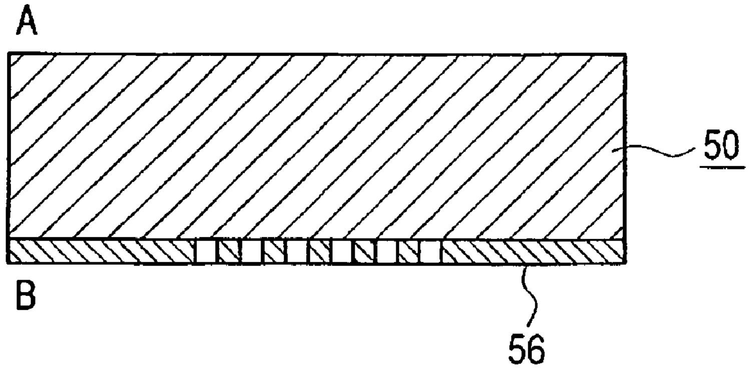
FIGS. 2A, 2B and 2C are views showing process steps of a producing method for a liquid discharge head in another embodiment of the present invention.
Figure 2B:
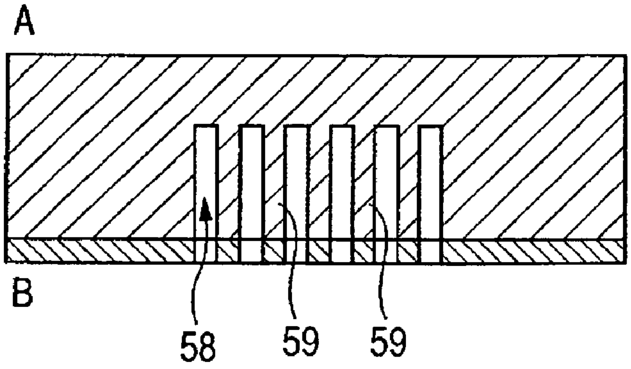
Figure 2C:
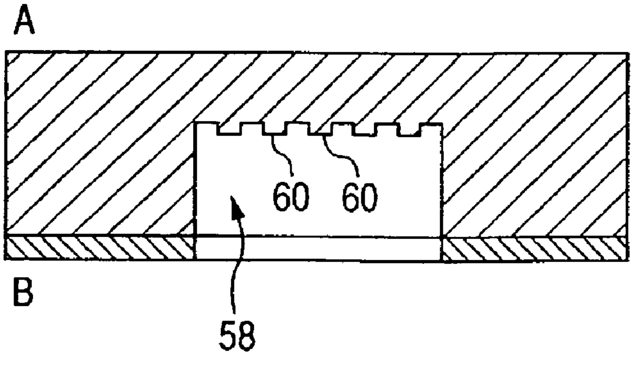

FIGS. 2A to 2C are views showing process steps of a producing method for a liquid discharge head in another embodiment.

(1) In the present embodiment, on a surface B of a substrate 50, there is formed, as shown in FIG. 2A, an etching mask pattern 56 including plural small apertures, which are mutually separated and arranged in a mosaic pattern within an area corresponding to a reservoir 58.

(2) After the step (1), an ICP discharge etching is executed to form plural pillar-shaped members 59, which are mutually separated and arranged in a mosaic pattern within the area corresponding to the reservoir 58, as shown in FIG. 2B.

(3) After the step (2), an isotropic etching is executed for example with TMAH (tetramethyl ammonium hydroxide) to remove the plural pillar-shaped members 59, as shown in FIG. 2C.

The present embodiment can reduce an unevenness in etching depth, in the recessed portion corresponding to the reservoir, at the ICP discharge etching, and can obtain a flat etched bottom. In this case, small projections 60 are formed on the etched bottom in the recessed portion corresponding to the reservoir 58, but are practically permissible. In case of employing TMAH as the isotropic etchant, a thermal oxide film is preferably employed as the etching mask pattern for the ICP discharge etching.

Also the small apertures arranged in a mosaic pattern in the etching masking pattern may have a same shape or may be of a combination of shapes of different areas. Apertures of a same shape show little area-dependence of the etching rate and provide a same etching depth.

In apertures of shapes having different areas, a larger aperture provides a relatively larger etching rate while a smaller aperture provides a relatively smaller etching rate, and this phenomenon may be utilized to form a step difference on the bottom of the recessed portion.

As the etchant for isotropic etching, an acid mixture of hydrofluoric acid, acetic acid and nitric acid or an etching gas, principally constituted of fluorine, may also be employed if such etchant is compatible with the process steps. In such case, the etching mask pattern layer is suitably selected in consideration of such process.

The pressure generating element can be constituted of a piezoelectric film, an electrostrictive element, a heat generating element or an electrostatic force, but any element capable of generating a discharge pressure may be employed for this purpose.

A piezoelectric film or an electrostrictive film may be formed on a vibrating plate for example by adjoining a piezoelectric film or an electrostrictive film, formed on a film-forming substrate, with an adhesive material or by an anodic adjoining, and then stripping off the film-forming substrate. It is also possible to form a lower electrode directly on the vibrating plate, and then to form a piezoelectric film or an electrostrictive film by a film forming method usable within a temperature range permissible for the structured member and usable in consideration of the process steps. For this purpose, there can be employed a sputtering, a CVD, a sol-gel method, an EB evaporation or a laser ablation.

A perovskite compound can be employed as the material for the piezoelectric or electrostrictive film, for example a piezoelectric material such as lead zirconate titanate (PZT, $Pb(Zr_xTi_{1-x})O_3$) or barium titanate $BaTiO_3$, or a relaxor type electrostrictive material. PZT preferably has an MPB (meso phase boundary) composition having an x value within a range of 0.40 to 0.65, but other compositions are also usable. PZT may have a tetragonal or rhombohedral crystalline structure. $BaTiO_3$ is preferably a film of tetragonal crystalline structure with a (001) orientation. Also $BaTiO_3$ may contain a trace amount of lead or bismuth.

Examples of the electrostrictive material employable in the present invention include followings:

PMN $[Pb(Mg_xNb_{1-x})O_3]$, PNN $[Pb(Nb_xNb_{1-x})O_3]$, PSN $[Pb(Sc_xNb_{1-x})O_3]$, PZN $[Pb(Zn_xNb_{1-x})O_3]$, PMN-PT $\{(1-y)[Pb(Mgd_xNb_{1-x})O_3]\text{-}y[PbTiO_3]\}$, PSN-PT {(1−y) [Pb $(Sc_xNb_{1-x})O_3]$-y$[PbTiO_3]\}$, PZN-PT $\{(1-y)\ [Pb(Zn_xNb_{1-x})O_3]$-y$[PbTiO_3]\}$, LN $[LiNbO_3]$, and KN $[KNbO_3]$, where x and y each represents a number from 1 to 0. For example, for PMN, x is preferably 0.2-0.5; for PSN, x is preferably 0.4-0.7; for PMN-PT, y is preferably 0.2-0.4; for PSN-Pt, y is preferably 0.35-0.5; and for PZN-PT, y is preferably 0.03-0.35. Also there may be employed PMN-PZT, PZN-PZT, PNN-PZT or PSN-PZT, formed by partly substituting Ti with Zr in PMN-PT, PZN-PT, PNN-PT or PSN-PT.

The piezoelectric film or the electrostrictive film may be formed by a single composition or by a combination of two or more compositions. Also such composition may be formed by doping the above-mentioned principal components with a trace amount of another element. The piezoelectric film or the electrostrictive film, in order to exhibit an excellent piezoelectric property, is desirably controlled in the crystal structure, preferably contains a specified orientation of a specified crystal structure by 50% or more in an X-ray diffractometry, more preferably by 90% or more.

A material for forming the vibrating plate can be borosilicate glass (glass SD2, manufactured by Hoya Corp.), silicon oxide, ceramics, or a metal such as nickel or chromium. The vibrating plate is formed by adjoining a vibrating plate member in a thick plate shape to a flow path forming substrate and thinning such vibrating plate member. It may also be formed by forming a vibrating plate on a supporting substrate, then transfer adjoining it onto the flow path forming substrate and removing the supporting substrate. The member including the vibrating plate and the flow path forming substrate are advantageously adjoined by an anodic adjoining (bonding), or a solid-phase adjoining (bonding), utilizing interatomic bonding/thermal diffusion. Representative methods of solid-phase adjoining (bonding) include Au adjoining and AuSn alloy adjoining.

The piezoelectric actuator element or the electrostrictive actuator element mentioned above may have a thin film structure utilizing a bending deformation of the vibrating plate.

In the following, the present invention will be further clarified by examples, in which a dimension, a shape, a material and a drive condition of the pressure generating element, vibrating plate, pressure generating chamber, rear constricted part, reservoir, nozzle communication opening and nozzle aperture are given as mere examples and are arbitrarily changeable as design matters. The rear constricted part communicates, as a rear resistance element, with the pressure generating chamber, and the nozzle communication opening is a flow path communicating with the nozzle aperture.

Embodiment 1

FIGS. 3A to 3E show process steps of a producing method for a liquid discharge head in an embodiment 1 of the present invention.

Figure 3A:
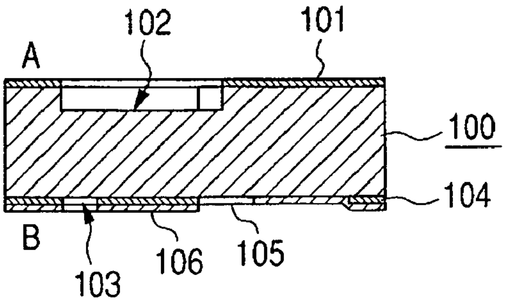
FIGS. 3A, 3B, 3C, 3D and 3E are views showing process steps of a producing method for a liquid discharge head in an embodiment 1 of the present invention.
Figure 3B:
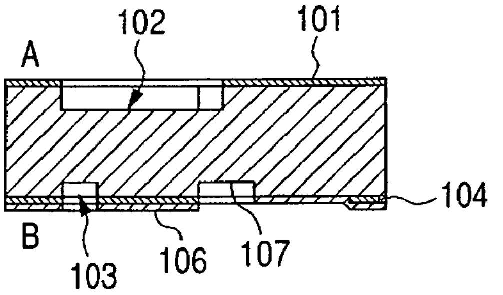
Figure 3C:
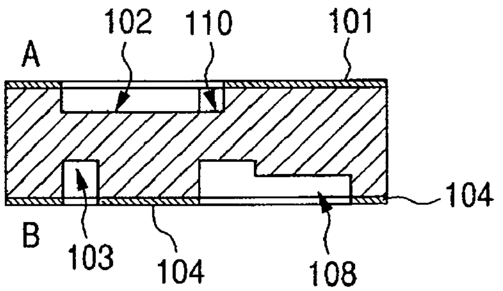
Figure 3D:
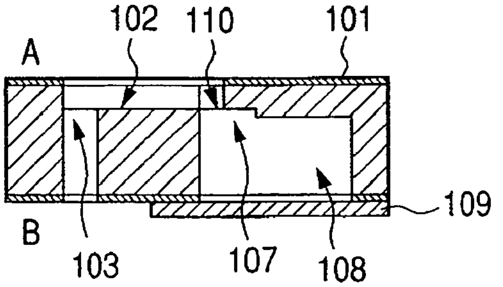
Figure 3E:
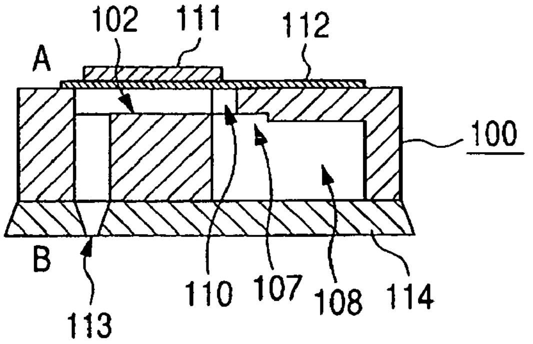

The liquid discharge head of the present embodiment includes, as shown in FIG. 3E, a pressure generating chamber 102 (width: 60 μm, depth: 50 μm, length 2.5 mm), a reservoir 108, a rear constricted part 110 constituting a communicating part, and a nozzle communication opening 103 in a single crystal Si substrate 100 of a thickness of 200 μm (hereinafter referred to as "substrate"). A nozzle plate 114, having nozzle apertures 113 with a density of 300 dpi, is adhered, with an adhesive material, in such a manner that the nozzle aperture 113 and the nozzle communication opening 103 of the substrate mutually communicate.

In the actuator, the vibrating plate 112 was formed by a borosilicate glass (glass SD2, manufactured by Hoya Corp.) of a thickness of 3 μm. A piezoelectric film 111 was formed thereon, constituted of upper Pt film (100 nm thickness)/$Pb(Zr_{0.52}Ti_{0.48})O_3$ (1 μm thickness)/lower Pt film (100 nm thickness). The lower and upper electrodes were connected to a driving IC in such a manner that each actuator can be driven independently.

In the following, a producing method of a liquid discharge head of the present embodiment will be explained in detail, with reference to FIGS. 3A to 3E.

(1) As shown in FIG. 3A, on a surface A which is one of two principal planes of a substrate 100, an etching mask pattern 100 is formed with a thermal oxide film (1 μm) having an aperture corresponding to the pressure generating chamber 102 and an aperture corresponding to the rear constricted part 110. Also on a surface B which is the other of the two principal planes of the substrate 100, a first etching mask pattern 104 is formed with a thermal oxide film (1 μm) having an aperture corresponding to the reservoir 108 and an aperture corresponding to the nozzle communication opening 103. As a second layer thereon, a second etching mask pattern 106 is formed with a resist film (1.5 μm) having an aperture corresponding to the nozzle communication opening 103 and an aperture corresponding to the communicating part nearby area 107 in the reservoir.

(2) After the step (1), the pressure generating chamber 102 is etched by an ICP discharge etching to a depth of 50 μm. Then, as shown in FIG. 3B, an ICP discharge etching is executed with the second etching mask pattern 106 to etch a recess corresponding to the nozzle communication opening 103 on the surface B and a recess corresponding to the communicating part nearby area 107, within a recess corresponding to the reservoir 106, to a depth of 10 μm.

(3) After the step (2), the resist film constituting the second etching mask pattern on the surface B is removed, as shown in FIG. 3C, by an oxygen plasma etching. Subsequently, an ICP discharge etching is executed on the surface B, utilizing the first etching mask pattern 104, thereby connecting the reservoir 108 and the rear constricted part 110 through the connecting part nearby portion 107.

As the etching rate is dependent on the area in the ICP discharge etching, the reservoir 108, having a relatively larger area than in the nozzle communication opening 103, communicates at first with the rear constricted part 110.

(4) After the step (3), a masking layer 109 formed by a resist material is provided in thus communicating reservoir 108 as shown in FIG. 3D, thereby preventing it from being etched, and the nozzle communication opening 103 (depth 150 μm) is etched in succession to connect it with the pressure generating chamber 102. Thereafter, the thermal oxide film constituting the first etching mask pattern 104 and present on both surfaces of the substrate is etched off with BHF.

(5) After the step (4), an actuator is formed as shown in FIG. 3E, by a following procedure.

Figure 4:
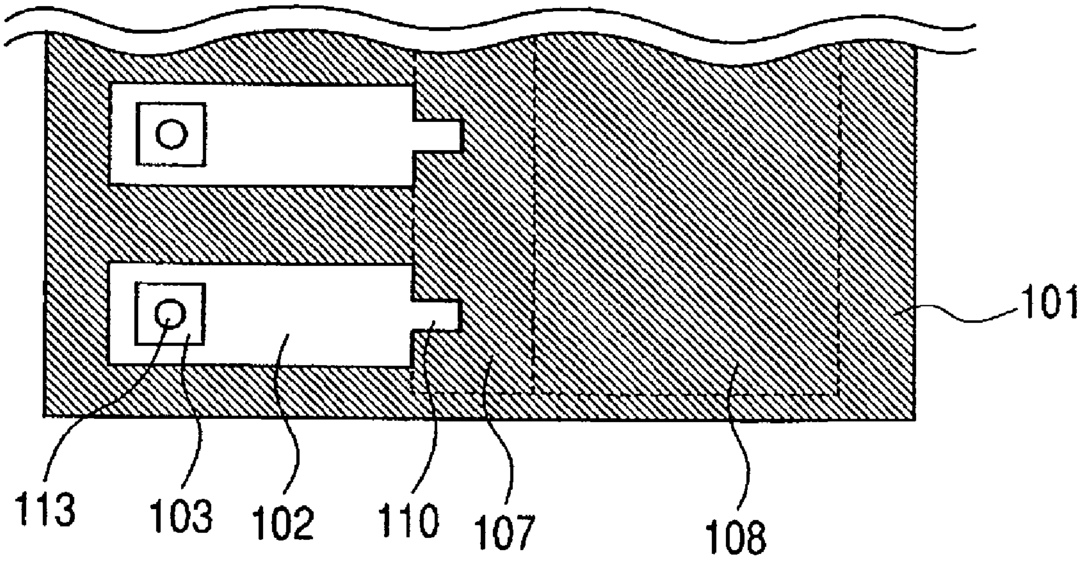
FIG. 4 is a view showing a mask pattern for the liquid discharge head in the embodiment 1 of the present invention.

FIG. 4 is a schematic view, seen from the surface A side, of the substrate of the head without the vibrating plate and the piezoelectric film in FIG. 3E.

A borosilicate glass (glass SD2, manufactured by Hoya Corp.), polished flat to a thickness of about 30 μm, is anodic adjoined, under conditions of 400° C. and 400 V, onto the pressure generating chamber 102 of the substrate 100. Then it is made thinner to 3 μm by an HF wet etching, thereby forming a vibrating plate 112. Then upper Pt film (100 nm thickness)/$Pb(Zr_{0.52}Ti_{0.48})O_3$ (1 μm or more thickness)/lower Pt film (100 nm thickness) are formed thereon by a vacuum film forming process. Prior to the formation of the upper Pt electrode, the PZT film is sintered in an oxygen atmosphere under conditions of 680° C. and 5 hrs., and the crystallization of PZT film is confirmed by XRD. Then wirings are formed utilizing a photolithographic process and a dry etching process.

Finally, a nozzle plate 114 is adhered and fixed in the following manner. The nozzle plate 114 is constituted of a SUS304 plate of a thickness of 50 μm, in which nozzle apertures 113 (having a diameter of 20 μm at the discharge side and a diameter of 50 μm at the opposite side) are formed by punching. An adhesive material is spin coated on the nozzle plate 114, which is then aligned with the substrate 100, utilizing alignment markers provided on the nozzle plate 114 and the substrate 100, and fixed under conditions of 70° C., 30 minutes.

In the present embodiment, the recess corresponding to the reservoir 108 is regulated in the depth of a partial area thereof, whereby a central part of the reservoir 108 need not be excessively etched. It is thus rendered possible to provide a liquid discharge head having a higher precision than in the prior technologies and excellent in durability and reliability in the ink discharge operation.

Embodiment 2

FIGS. 5A to 5F show process steps of a producing method for a liquid discharge head in an embodiment 2 of the present invention.

Figure 5A:
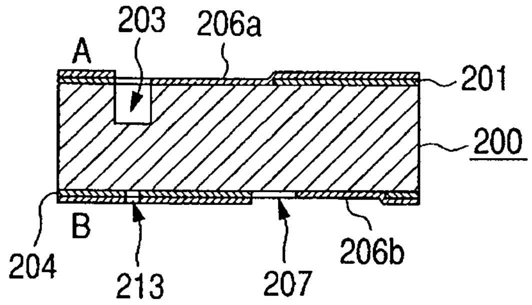
FIGS. 5A, 5B, 5C, 5D, 5E and 5F are views showing process steps of a producing method for a liquid discharge head in an embodiment 2 of the present invention.
Figure 5D:
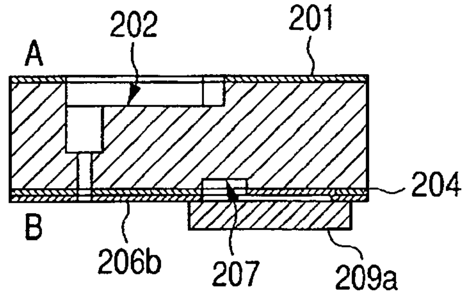
Figure 5B:
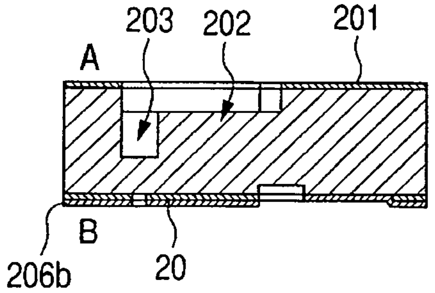
Figure 5E:
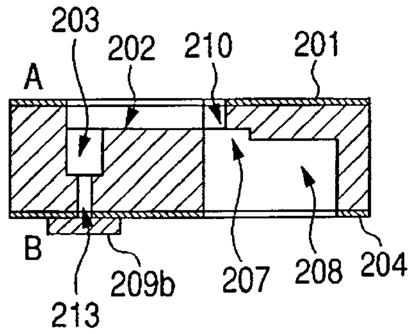
Figure 5C:
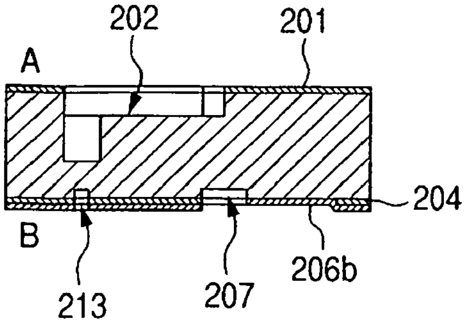
Figure 5F:
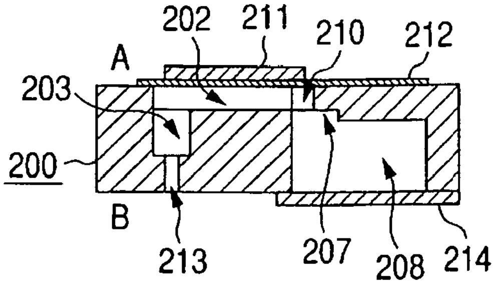

The liquid discharge head of the present embodiment includes, as shown in FIG. 5F, a reservoir 208, a pressure generating chamber 202 (width: 60 μm, depth: 50 μm, length 2.5 mm), a rear constricted part 210, and a nozzle communication opening 203 in a single crystal Si substrate 200 of a thickness of 200 μm. The basic constitution is same as in Embodiment 1, but a nozzle aperture 213 is integrally formed in the substrate 200 so as to communicate with the nozzle communication opening 203. The actuator including a vibrating plate 212 and a piezoelectric film 211 is similar to that in Embodiment 1.

In the following, a producing method of a liquid discharge head of the present embodiment will be explained in detail, with reference to FIGS. 5A-5F.

(1) In the present embodiment, in order to form the nozzle aperture in the same substrate, the nozzle communication opening 203 is formed from the side of the pressure generating chamber 202, as shown in FIG. 5A. On the surface A of the substrate 200, a first etching mask pattern 201 is formed by a thermal oxide film (1 μm) with an aperture corresponding to the pressure generating chamber 202 and the rear constricted part 210. Then a photoresist is coated thereon (4 μm) to form a second etching mask pattern 206*a* having an aperture corresponding to the nozzle communication opening 203.

Also on a surface B of the substrate 200, a first etching mask pattern 204 is formed by a thermal oxide film (1 μm) having apertures respectively corresponding to the nozzle aperture 213 and the reservoir 208. Then a photoresist is coated thereon (4 μm) to form a second etching mask pattern 206*b* having apertures respectively corresponding to the nozzle aperture 213 and the communicating part nearby area 207 within a recess corresponding to the reservoir 208.

(2) After the step (1), an ICP discharge etching is executed, utilizing the second etching mask pattern on the surface A to form a recess of a depth of 200 μm, corresponding to the nozzle communication opening 203 (50×200 μm □ area).

(3) After the step (2), the resist film constituting the second etching mask pattern 206*a* on the surface A is removed, as shown in FIG. 5B, by an oxygen plasma etching. Subsequently, the first etching mask pattern 201 having the apertures corresponding to the pressure generating chamber 202 and the rear constricted part 310 is used to form a recess of a depth of 50 μm corresponding to the pressure generating chamber 202, by an ICP discharge etching. Since a recess of a depth corresponding to the nozzle communication opening 203 is already formed, this etching step forms a pressure generating chamber 202 and a nozzle communication opening 203 mutually communicating in the same substrate.

(4) After the step (3), ICP discharge etchings of plural steps utilizing the two-layered etching mask patterns are executed, as in the preceding step, in order to form the nozzle aperture 213, the reservoir 208 and the communicating part nearby area 207 in the vicinity of the communicating part within the reservoir, on the surface B as shown in FIG. 5C. At first an ICP discharge etching is executed with the second etching mask pattern 206*b* to form recessed portions, corresponding to the nozzle aperture 213 and the communicating part nearby area 207 in the vicinity of the communicating part in the reservoir 208, with a depth of 25 μm.

(5) After the step (4), an ICP discharge etching is executed on the surface B as shown in FIG. 5D to form a recessed portion of a depth of 50 μm, corresponding to a nozzle aperture 213 (having a diameter of 20 μm at the discharge side and a diameter of 50 μm at the opposite side). In this operation, a mask layer 209*a* is provided on the communicating part nearby area 207 in the reservoir 208 to prevent an etching thereon.

(6) After the step (5), the resist film constituting the second etching mask pattern 206*b* on the surface B is removed, as shown in FIG. 5E, by an oxygen plasma etching. Also in this operation, the nozzle aperture 213 is protected by a mask layer 209*b* from being etched. Thereafter an ICP discharge etching is executed in succession, utilizing the first etching mask pattern 204 on the surface B, thereby connecting the reservoir 208 and the rear constricted part 210 through the communicating part nearby area 207. Then the thermal oxide film present on both surfaces of the substrate is etched off by BHF.

(7) After the step (6), an actuator including a vibrating plate 212 and a piezoelectric film 211 is formed as shown in FIG. 5F, by a process similar to that in Embodiment 1. Also the aperture of reservoir 208 is closed by a sealing plate 214.

As explained in the foregoing, a partial area of the reservoir 208 is regulated in the depth, whereby a central part of the reservoir need not be excessively etched. Also the entire flow path including the nozzle aperture 213 is formed on a same substrate, there can be avoided an alignment error at the adhering step, as in the structure of adhering a nozzle plate. As a result, it is possible to provide a liquid discharge head having a higher precision than in the prior technologies and excellent in durability and reliability in the ink discharge operation.

Embodiment 3

Figure 6A:
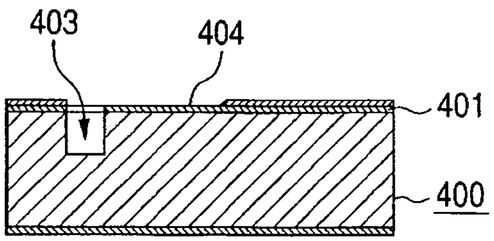
FIGS. 6A, 6B, 6C, 6D, 6E and 6F are views showing process steps of a producing method for a liquid discharge head in an embodiment 3 of the present invention.
Figure 6D:
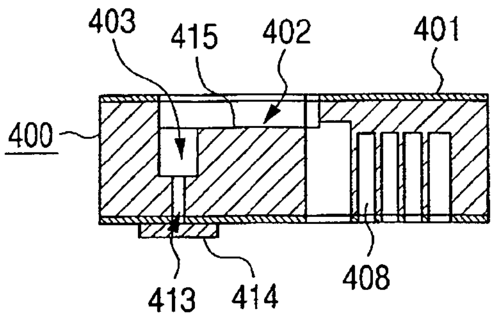
Figure 6B:
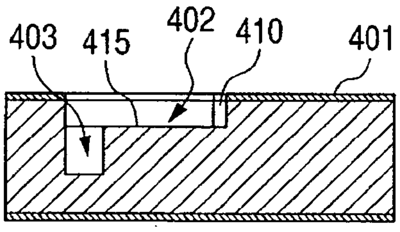
Figure 6E:
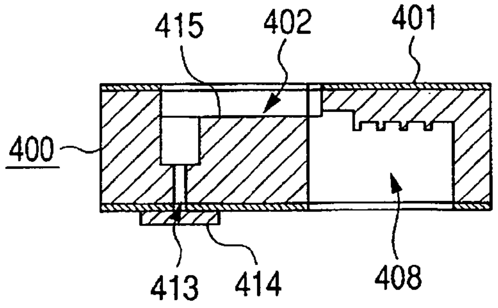
Figure 6C:
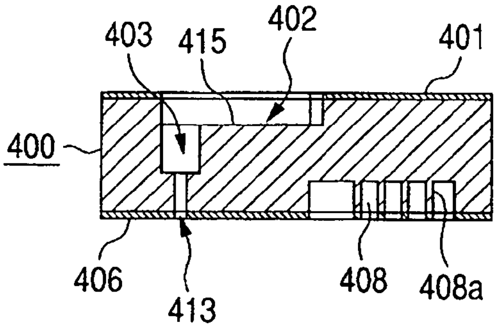
Figure 6F:
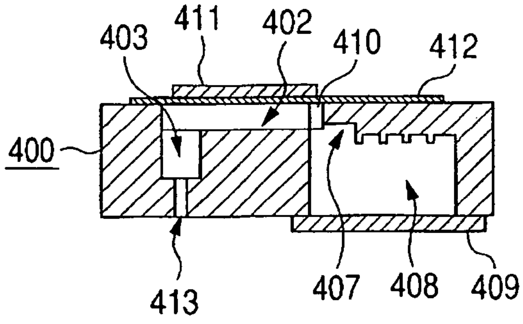

The liquid discharge head of the present embodiment has a fluid flow path including, as shown in FIG. 6F, a reservoir 408, a pressure generating chamber 402 (width: 60 μm, depth: 50 μm, length 2.5 mm), a rear constricted part 410, a nozzle communication opening 403 and a nozzle aperture 413 in a single crystal Si substrate 400 of a thickness of 300 μm (hereinafter referred to as "substrate"). The basic constitution is same as in Embodiment 1, but the nozzle aperture 413 is integrally formed in the substrate 400 so as to communicate with the nozzle communication opening 403. The actuator including a vibrating plate 412 and a piezoelectric film 411 is similar to that in Embodiment 1.

In the following, a producing method of a liquid discharge head of the present embodiment will be explained in detail.

(1) In the present embodiment, in order to form the nozzle aperture in the same substrate, the nozzle communication opening 403 is formed from the side of the pressure generating chamber 402, as shown in FIG. 6A. Thermal oxide films are formed with a thickness of 1 μm on both principal planes of the substrate 400. On the surface A of the substrate 400, a first etching mask pattern 401 is formed by the thermal oxide film (1 μm) with an aperture for forming the pressure generating chamber 402 and the rear constricted part 410. Then a photoresist is coated thereon (4 μm) to form a second etching mask pattern 404 having an aperture for forming the nozzle communication opening 403. Then an ICP discharge etching is executed, utilizing the second etching mask pattern 404, to form a recessed portion of a depth of 200 μm, corresponding to the nozzle communication opening 403 (50×200 μm □ area).

(2) After the step (1), the resist film constituting the second etching mask pattern 404 on the surface A is removed, as shown in FIG. 6B, by an oxygen plasma etching, thereby exposing the thermal oxide film constituting the first etching mask pattern 401 for forming the pressure generating chamber 402.

(3) After the step (2), an ICP discharge etching is executed, utilizing the first etching mask pattern 401 on the surface A, to form a recessed portion of a depth of 50 μm corresponding to the pressure generating chamber 402 and the rear constricted portion 410. As a recess of a depth corresponding to the nozzle communication opening 403 is already formed, this etching step forms the pressure generating chamber 402 and the nozzle communication opening 403 mutually communicating in the same substrate.

As the present embodiment employs an alkali etchant in forming the reservoir 408, a thermal oxide film 415 of a thickness of 50 nm is formed on the wall faces of thus formed flow path.

Figure 7:
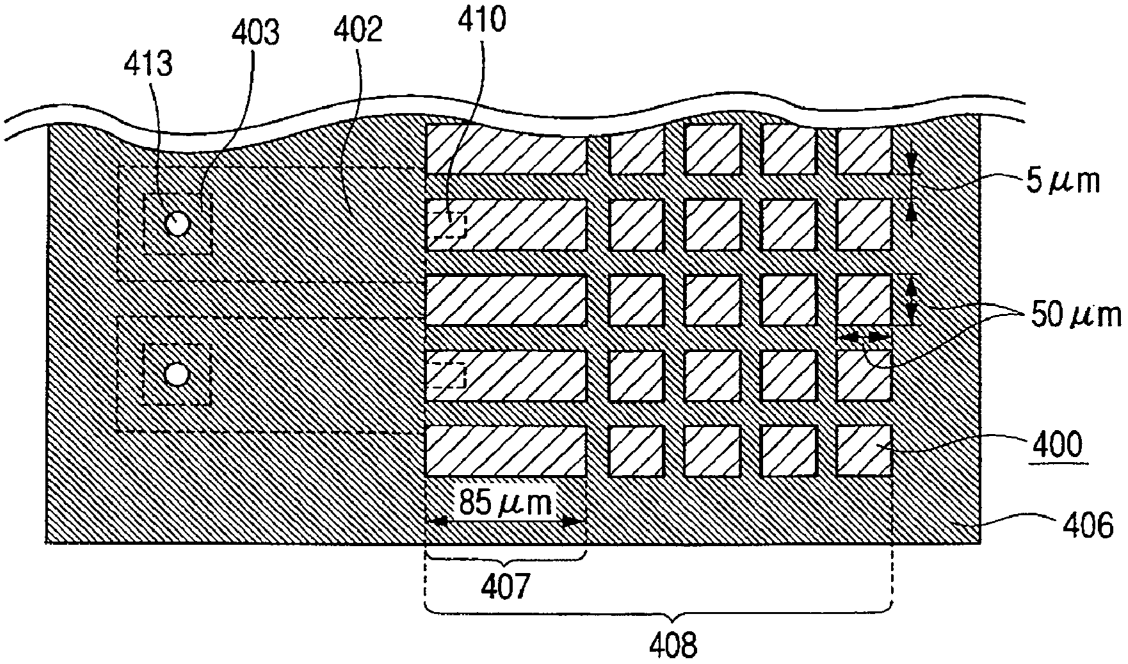
FIG. 7 is a view showing a mask pattern for the liquid discharge head in the embodiment 3 of the present invention.
Figure 8:
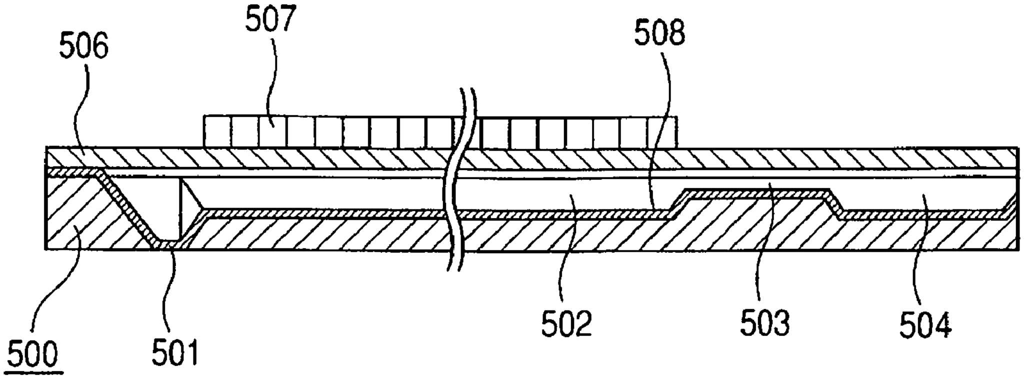
FIG. 8 is a schematic cross-sectional view showing a prior ink jet head.
Figure 9A:
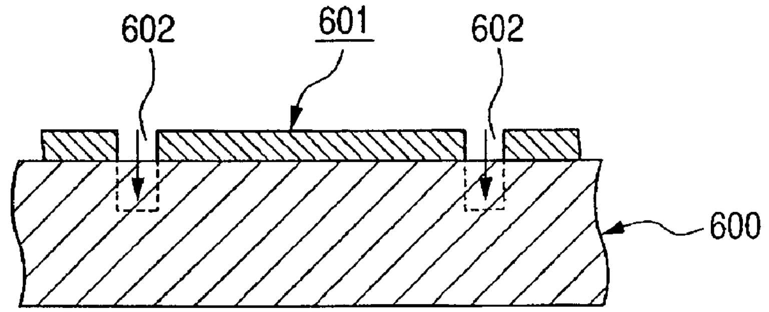
FIGS. 9A, 9B, 9D and 9D are views showing process steps of a producing method for another prior liquid discharge head.
Figure 9B:
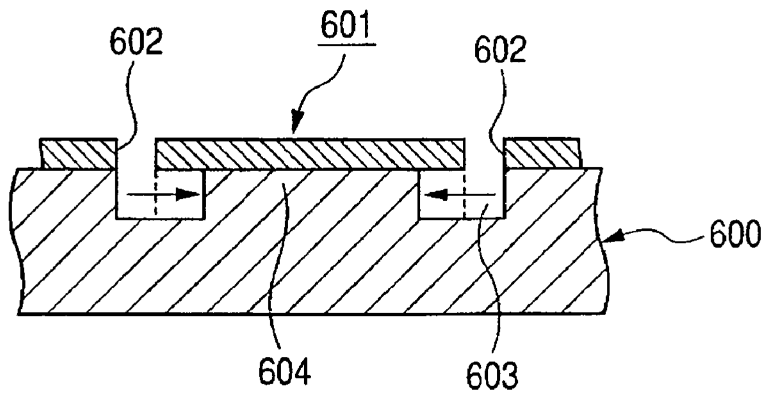
Figure 9C:
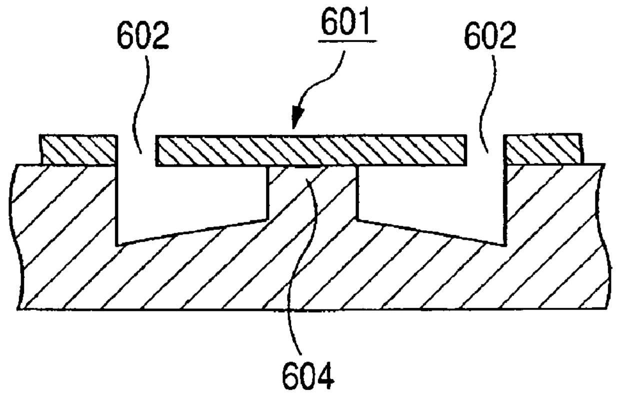
Figure 9D:
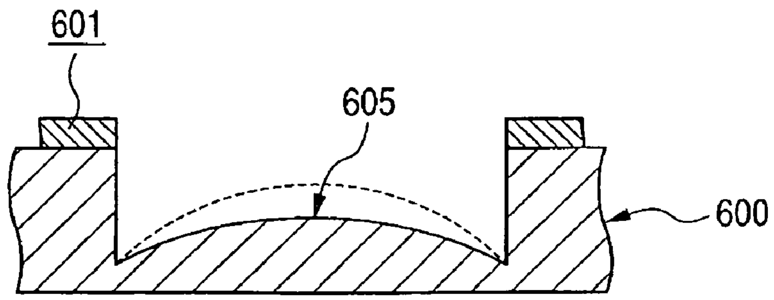

(4) After the step (3), the nozzle aperture 413 and the reservoir 408 are formed as shown in FIG. 6C. On a surface B of the substrate 400, a second etching mask pattern 406 is formed by a thermal oxide film (1 μm) having an aperture for forming the nozzle aperture 413 and the reservoir 408. FIG. 7 is a schematic view seen from the side of the surface B (on which the reservoir is to be formed) in the state shown in FIG. 6C. The mask pattern for the reservoir 408 is so formed as to divide an area, for forming the reservoir, into a grid (matrix) pattern. The grid pattern is formed by an etching mask pattern 406 including plural small apertures which are mutually spaced and arranged in a mosaic shape in an area corresponding to the reservoir 408.

An aperture area corresponding to each grid in the etching pattern, formed in an area corresponding to the communicating part nearby area 407 within the reservoir 408, is larger than that, formed in an area of the reservoir 408, other than the communicating part nearby area 407. More specifically, the etching pattern (aperture area) has, in an area corresponding to the reservoir 408 excluding the communicating part nearby area 407, an aperture area of 50×50 μm. Between the grid areas, the etching pattern has a width of 5 μm. Such grid areas are matrix arranged in an area of 850 μm (length for each head) by 20 mm (length for all the heads) within a recess corresponding to the reservoir 408. On the other hand, in the area corresponding to the communicating part nearby area 407 in the vicinity of the rear constricted part 410 constituting the communicating part, the etching pattern has a grid aperture area of 50×85 μm, larger than that has in other grid patterns.

(5) After the step (4), an ICP discharge etching is executed, utilizing the above-explained etching mask pattern 406, to form recessed portions respectively corresponding to the nozzle aperture 413 and the reservoir 408, until the nozzle reaches a depth of 50 μm. The nozzle aperture 413 thus formed has a diameter of 20 μm at the discharge side and a diameter of 20 μm at the opposite side.

(6) An ICP discharge etching is executed in succession to the step (5), thereby connecting, as shown in FIG. 6D, the communicating part nearby area 407 of the reservoir 408 with the rear constricted part 410 of the pressure generating chamber 402. In the present embodiment, etching patterns of two different etching areas are provided in the recess corresponding to the reservoir 408, utilizing that the etching rate in the ICP discharge etching is dependent on the aperture area. Therefore, within the reservoir 408, the communicating part nearby area 407, present in the vicinity of the communicating area within the reservoir 408 and having relatively wider etching apertures, is etched deeper than an average depth of the reservoir 408. As explained above, the grid pattern is selected as 50×50 μm in an area corresponding to the reservoir 408 other than the communicating part nearby area 407, and as 50×85 μm in an area corresponding to the communicating part nearby area 407. However, in order to obtain a more evident difference in the etching rate, the grid pattern may be selected as 20×20 μm in the area corresponding to the reservoir 408 other than the communicating part nearby area 407, and as 50×85 μm in the area corresponding to the communicating part nearby area 407.

In this operation, the nozzle aperture 413 is protected by a resist film 411*a* from being etched.

(7) After the step (6), the plural pillar-shaped members 408*a* thus formed are removed by an immersion in a TMAH solution for about 1 minute at 80° C. In this operation, the nozzle aperture 413 is protected by a masking layer 414 and a jig from being etched. Thereafter, the thermal oxide film present on both surfaces of the substrate 400 is etched off with BHF.

(8) After the step (7), an actuator including a vibrating plate 412 and a piezoelectric film 411 is formed as shown in FIG. 6F, by a process similar to that in Embodiment 1.

As described above, the bottom of the reservoir can be formed by planarized areas of two different depths, whereby the reservoir can be formed with an arbitrary shape and with a high shaping precision. Also, because the fluid flow path including the nozzle aperture is formed on a same substrate, there can be avoided an alignment error at the adhering step which occurs as in the structure of adhering a nozzle plate. As a result, it is possible to provide a liquid discharge head having a higher precision than in the prior technologies and excellent in durability and reliability in the ink discharge operation.

The present invention may employ not only the plasma etching explained in the foregoing embodiments, but also other etching methods such as a drying etching or a wet etching.

This application claims priority from Japanese Patent Application No. 2005-148894 filed May 23, 2005, which is hereby incorporated by reference herein.

What is claimed is:

1. A producing method for a liquid discharge head including plural pressure generating chambers respectively provided with pressure generating elements, plural nozzle holes respectively communicating with the plural pressure generating chambers and adapted to discharge a liquid, and a reservoir with which the plural pressure generating chambers commonly communicate respectively through communicating parts, the reservoir being provided with a shallow portion having a depth less than a depth of a communicating portion in the reservoir, the communicating portion being in a vicinity of at least one of the communicating parts, the method comprising:

a step of executing an etching in a portion corresponding at least to the communicating portion on one of two principal planes of a substrate, thereby forming a predetermined recessed portion on the one of the principal planes;

a step of executing an etching in a portion corresponding to the reservoir and the predetermined recess portion, on the one of the two principal planes of the substrate, thereby forming a recessed portion constituting the reservoir having the shallow portion on the one of two principal planes; and a step of executing an etching in a portion corresponding to the pressure generating chamber on the other of the two principal planes, thereby forming a recessed portion constituting the pressure generating chamber, which communicates with the at least one of the communicating parts on the other of the two principal planes.

2. A producing method for a liquid discharge head according to claim 1, wherein:

the step of executing an etching in the portion corresponding to the reservoir and the predetermined recess portion is executed by laminating, in succession, on the substrate, a first etching pattern having an aperture corresponding to the reservoir and a second etching pattern having an aperture corresponding at least to the communicating portion, the aperture corresponding at least to the communicating portion being included in the aperture corresponding to the reservoir, executing an etching utilizing the second etching pattern and a stripping thereof, and then executing an etching utilizing the first etching pattern.

3. A producing method for a liquid discharge head according to claim 1, wherein:

the step of executing an etching in the portion corresponding to the reservoir and the predetermined recess portion includes a step of forming a grid-shaped etching pattern in an area corresponding to the reservoir on the substrate, and an aperture area per grid of the etching pattern formed in an aperture corresponding at least to the communicating portion is larger than an aperture area per grid of the etching pattern formed in an aperture corresponding to the reservoir, other than the aperture corresponding at least to the communicating portion.

* * * * *